March 16, 1954

O. SCHMID 2,672,215

CYCLONE SEPARATOR FOR SEPARATING
SOLID PARTICLES FROM GASES

Filed Aug. 16, 1951

INVENTOR:
OTTO SCHMID
BY *[signature]*
AGT.

Patented Mar. 16, 1954

2,672,215

UNITED STATES PATENT OFFICE 2,672,215

CYCLONE SEPARATOR FOR SEPARATING SOLID PARTICLES FROM GASES

Otto Schmid, Paris, France

Application August 16, 1951, Serial No. 242,065

Claims priority, application Germany August 18, 1950

4 Claims. (Cl. 183—84)

The present invention relates to centrifugal separators which separate solid or liquid particles from air or gases, by the action of centrifugal forces. The effect of such separators, as generally known, consists in that the gas to be purified is imparted a rapid rotational motion in the centrifuging chamber by an inlet directing device, for instance by a gas inlet tangent to the centrifuging chamber or by an axial device imparting a rotation motion or other means, the particles to be separated being thus projected against the wall under the action of centrifugal forces. Due to gravity and to the secondary stream which may exist, the particles reach the collecting container of any shape whatsoever, mounted at the end of the centrifugation chamber and are separated therein.

An object of the present invention is to improve these centrifugal separators to ensure a more complete suction of the gas escaping through the outlet tube and to avoid a re-intake of the dust already separated which is in the collecting container, while preventing the concentration, in the centrifugation chamber, of fine particles, detrimental to the efficiency of the separator.

Another object of the invention is to create a centrifugal separator of this type wherein the central whirling nucleus, of a relatively small section, formed inside the centrifugation chamber due to the suction caused by the cyclone, is limited to the upper portion of the collecting container, by a false bottom preventing its propagation, the suction, consequently, being unable to extend to the bottom of the hopper.

Another object of the invention is to give this false bottom a suitable position and a suitable area to produce the effect aimed at in optimum conditions.

Another object of the invention consists in arranging in the upper portion of the hopper or collecting container a frusto-conical envelope, the small upper aperture of which is engaged into the base of the centrifugation chamber and is designed with a section just sufficient to ensure the passing of the central ascending cyclonic column, but preventing the downward motion, around this column of the secondary stream due to the suction of the cyclonic column directly in said envelope of gas charged with particles, from the centrifugation chamber, all the gas charged with particles being made to move down in the hopper outside said envelope, where the gas, moving around the lower edge of said envelope and entering therein separates from the solid particles.

Another object of the invention is to give said frusto-conical envelope an optimum shape facilitating the excentric motion and the separation of particles in suspension in the whirling gas stream moving down from the centrifugation chamber by a fairly large base diameter.

Other objects and advantages of the invention will appear from the following detailed description.

Types of embodiment of the object of the invention are represented schematically, by way of examples, in the appended drawings.

Figure 1:
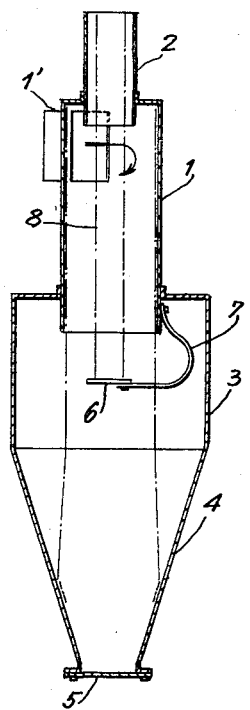
Figure 1 is a vertical section of the separator.

According to Fig. 1, I represents the centrifugation chamber into which opens a tangential conduit I', for the inlet of the gas charged with solid particles to be separated. 2 is the delivery conduit of the purified gas, placed at the upper portion of chamber I. 3 is a hopper for the accumulation of solid particles or dust particles, comprising a bottom 4 for the deposition of dust, which is normally closed by a flap 5 which may be opened from time to time for removing the accumulated dust.

A false bottom 6 is suspended by means of arms 7 in the hopper 3 at a certain distance above the lower edge of the centrifugation chamber and in the vertical axis of said chamber; the distance by which the false bottom 6 is arranged above the lower end of the centrifugation chamber is conveniently smaller than the inner diameter of said chamber. This false bottom has an area substantially equal to, but preferably slightly larger than the contemplated average cross section area of the ascending cyclonic column normally formed at the center of apparatus of this kind when placed in operation. The lines 8 indicate the average width of the column.

This apparatus operates as follows:

The gas stream, charged with solid particles, entering tangentially through the conduit I', preferably at the upper portion of the centrifugation chamber I, assumes in said chamber a violent whirling motion driving the solid particles, by a centrifugal action against the walls of said chamber; the purified gas goes out, through the conduit 2. The centrifugal action causes, at the center of the chamber, a depression which promotes the formation of an ascending whirling column or nucleus, 8 which rises towards the outlet conduit 2. When the descending cyclonic current goes out at the lower end of the chamber 1 and reaches the upper portion of the hopper 3, which has a larger diameter, the solid particles are again driven towards the peripheral area of the cylindrical portion of the hopper, and fall to the bottom thereof by gravity. The false bottom 6 stops the suction or cyclonic effect produced by the depression column 8 so that no suction is caused in the bottom of the hopper, and the particles deposited therein do not risk being carried along by the gas stream rising from the center thereof. The dust free gas, in the hopper, returns towards the center thereof and is sucked against the false bottom 6 to be carried along in the ascending column or cyclonic nucleus 8. The change in direction it is compelled to undergo and the resulting loss in speed do not allow it to reach the bottom 4 and to carry, along solid particles, so that purified gas only is driven into the ascending column 8.

Figure 2:
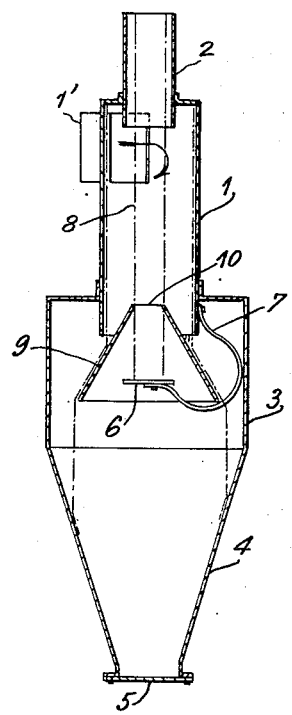
Figure 2 is a vertical section of a modified separator.

In the embodiment of Fig. 2, a frusto-conical envelope 9 is arranged in the hopper 3. This envelope, which may also be supported by the arms 7 opens, at its small upper aperture 10, substantially at the level of the lower portion of the centrifugation chamber 1, and extends down into the hopper 3. The section of the aperture 10 is equal to that of the ascending column or cyclonic nucleus 8 which fills it and is stopped by the false bottom 6, thus preventing the passing of the gas charged with solid particles into the frusto-conical envelope. Consequently, a secondary air stream, created by the suction of the cyclonic column on the false bottom 6, occurs outside the frusto-conical envelope towards the hopper, and drives away the dust particles, even fine ones which rotate inside the centrifugation chamber close to the axis thereof, towards the outside of the frusto-conical envelope, to the lower edge of said envelope. If the outer diameter of this envelope has been selected in such a manner that the speed of the air, sucked by the cyclonic column and entering the inside of the frusto-conical envelope, by passing around the lower edge of said envelope, is smaller than the speed of fall of the particles to be separated, the particles separate here from the secondary stream. This gas is thus perfectly freed of solid particles, as was shown by extensive tests. If the half angle at the apex of this envelope is smaller than the natural angle of fall of the particles to be separated, the larger diameter of said envelope may be selected freely according to the speed of fall of the particles to be separated.

Figure 3:
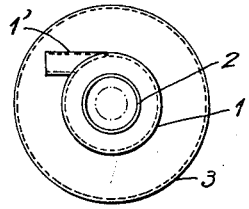
Figure 3 is a top plan view of the outer shell of the separators shown in Figs. 1 and 2.
Figure 6:
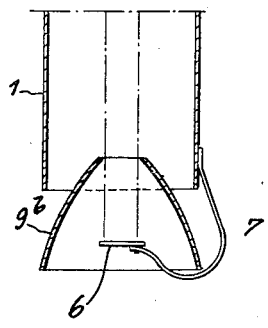
Fig. 6 is a partial vertical section showing a particular shaping of the frusto-conical envelope.

The upper portion of the frusto-conical envelope is preferably located above the lower end of the centrifugation chamber 1 and the false bottom 6 is also located preferably above the base of the frusto-conical envelope 9, as shown in Figs. 3 and 6.

Figure 4:
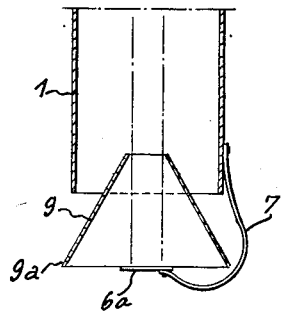
Fig. 4 is a partial vertical section showing one position of the false bottom.

Fig. 4, however, shows a modified type of embodiment wherein the false bottom 6a is arranged at the level of the lower end 9a of the frusto-conical envelope 9.

Figure 5:
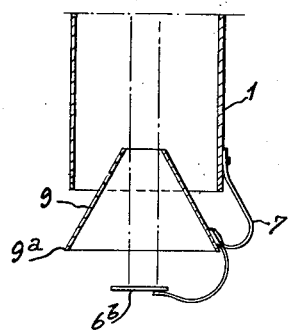
Fig. 5 is a partial vertical section showing another position of the false bottom.

Fig. 5 shows another modified embodiment wherein the false bottom 6b, on the contrary, is arranged underneath the lower edge 9a of the frusto-conical envelope 9.

Finally, Fig. 6 shows that any suitable shape may be given to the frusto-conical envelope; this envelope 9b, according to Fig. 6 offers a convex surface; it might be concave, as well or of any other desired shape.

Figure 7:
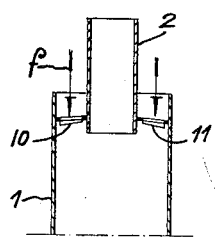
Fig. 7 illustrates a modification of the inlet means.

Fig. 7 shows, partly, a modification wherein the gas enters the centrifugation chamber 1 longitudinally, generally in the direction of the arrows f. Directing vanes 11 impart to the gas charged with solid particles, entering the chamber, a whirling motion necessary for dust removal. This modification of the intake is obviously applicable to all embodiments of the invention.

What I claim is:

1. A device for separating solid particles from fluids, comprising a tubular centrifugation chamber having an inlet, a tubular evacuation conduit extending into said chamber at one end thereof, said tubular evacuation conduit being smaller in width than that of said chamber, a hopper connected to the other end of said chamber, a hollow frusto-conical member positioned within said hopper and telescoping with its narrow end into and spaced from said other end of said chamber, to thereby form an annular passageway and positive guidance for fluid flow between said member and said chamber, and a plate element positioned within said hopper and below said chamber, the width of said chamber being greater than the distance of said plate element from the other end of said chamber, said element being lesser in width than said evacuation conduit.

2. A device for separating solid particles from gases, comprising a tubular centrifugation chamber having an inlet, a tubular evacuation conduit extending into said chamber at one end thereof, said tubular evacuation conduit being smaller in width than that of said chamber, a hopper connected to the other end of said chamber, said other end of said chamber extending a predetermined distance into said hopper, a hollow frusto-conical member positioned within said hopper and telescoping with its narrow end into and spaced from said other end of said chamber, to thereby form an annular passageway and positive guidance for gas flow between said member and said chamber, and a plate element positioned within said hopper and within the interior of said member below said chamber, the width of said chamber being greater than the distance of said plate element from the other end of said chamber, said element having a width greater than the width of said narrow end of said member and being lesser in width than said evacuation conduit.

3. A separator for solid particles in gases, according to claim 1, comprising a tangential inlet of the gas to be purified at the upper portion of the centrifugation chamber.

4. A separator for solid particles in gases, according to claim 1, comprising a longitudinal gas inlet in the centrifugation chamber and directing means imparting a whirling motion to the entering gas.

OTTO SCHMID.

References Cited in the file of this patent

FOREIGN PATENTS

| Number | Country | Date |
|---|---|---|
| 106,918 | Great Britain | June 14, 1917 |
| 176,352 | Switzerland | July 1, 1935 |
| 229,815 | Switzerland | Feb. 16, 1944 |